UNITED STATES PATENT OFFICE.

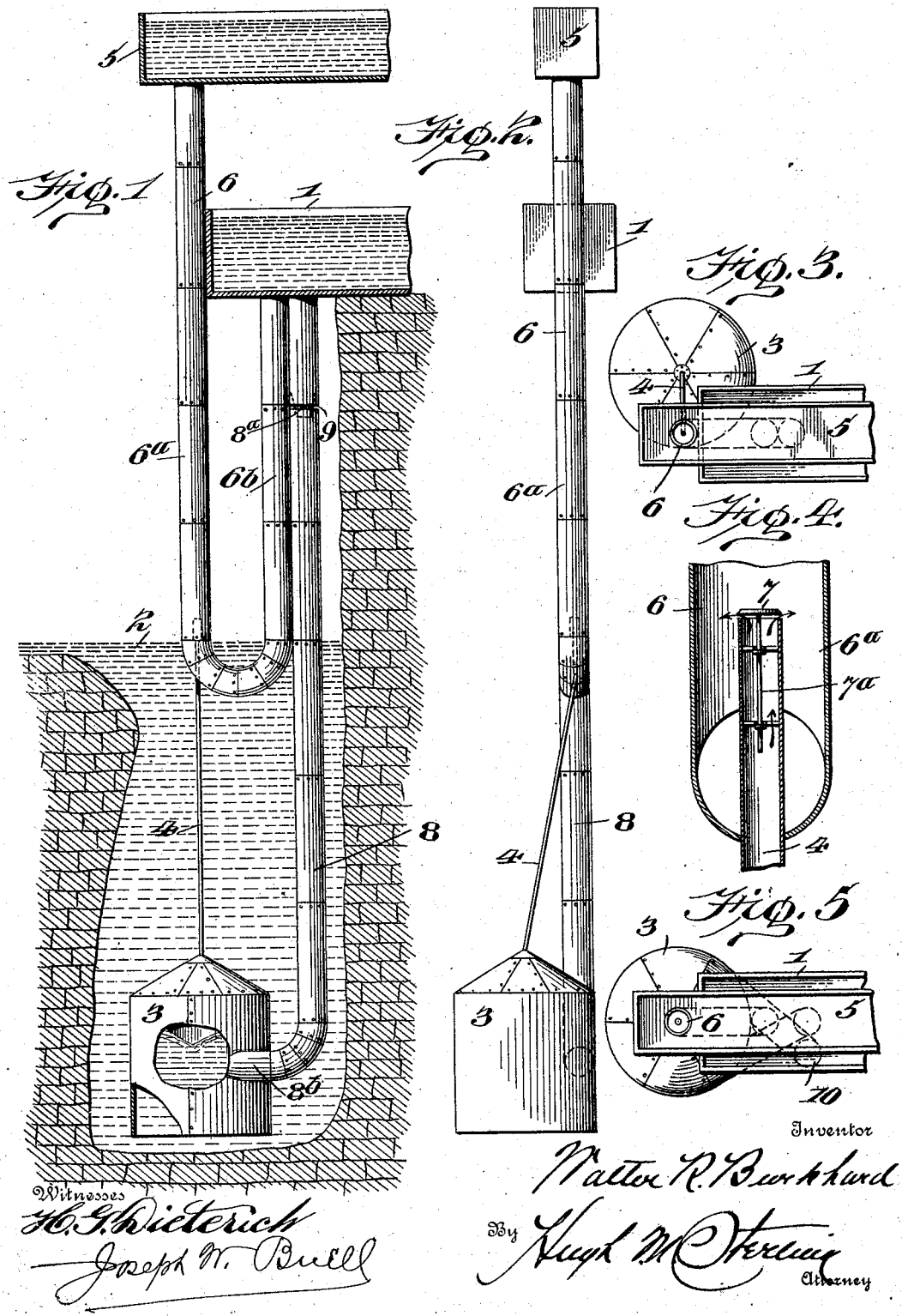

WALTER R. BURKHARD, OF BLISS, IDAHO.

APPARATUS FOR UTILIZING WATER-POWER.

No. 806,104.     Specification of Letters Patent.     Patented Dec. 5, 1905.

Application filed January 27, 1904. Serial No. 190,895.

*To all whom it may concern:*

Be it known that I, WALTER R. BURKHARD, a citizen of the United States, residing at Bliss, in the county of Lincoln and State of Idaho, have invented new and useful Improvements in Apparatus for Utilizing Water-Power, of which the following is a specification.

My invention relates to that class of apparatus for raising water in which the water is raised by means of the introduction of compressed air into a column of water, and it also relates to apparatus whereby water-power is employed for creating a supply of compressed air by introducing air within a descending column of water and collecting the same in a compression-chamber.

The primary object of the invention is to produce a system which will embody and combine the above principles of operation and provide an automatic water-lift suitable for installation at any source of water-power and which shall be self-governing and of a simple construction in which working parts are not required.

The invention consists in providing, in connection with a source of water-supply, a conduit connecting said source of supply and extending downward therefrom to form a loop one branch of which will extend to the point of required lift and in providing for the introduction of compressed air into the column of water to be lifted at a point in said loop as to cause expansion of said column alone.

The invention further consists in providing a cylindrical compression-chamber arranged in open relation with a basin of water below the source of supply and causing the descending column of water which supplies the compression-chamber with air to discharge within said chamber at a tangent, whereby to produce a swirling action of the water for the purpose of readily separating the air and cause it to collect in the air-compression space.

Further, the invention consists in certain features of arrangement and construction of parts, all as hereinafter described, and specifically set forth in the appended claims.

In the accompanying drawings, Figure 1 is a side view showing the apparatus as applied; Fig. 2, an end view; Fig. 3, a top view; Fig. 4, a section view of the discharge end of the air-compression pipe, showing a suitable check-valve for same; and Fig. 5, a top view showing a modified form of the compression-chamber in which the discharge of the water therefrom is upon a tangent.

Referring to the drawings, 1 indicates a tank or reservoir placed at the top of the effective head to receive a constant supply of water which is utilized to furnish the water to be elevated as well as the water used for generating the compressed air for aerating the column of water to be elevated. Below this source of supply is maintained a basin of water 2, which represents a natural or artificial accumulation of water of such depth as to provide for the requisite degree of compression of the air within the compression-chamber 3, which is open at the bottom to receive the pressure of the water and to form an outlet for the water discharged therein from the source of supply. This chamber is preferably cylindrical in form and provided with a conical top, from the apex of which extends a pipe 4, by which the compressed air is conducted to the place of use. In the present instance the compressed air is utilized for aerating a column of water supplied from the source of supply 1, so as to cause it by the expansion of its volume to reach the required elevation, which is indicated by the tank 5. The conduit 6, connecting the source of water-supply 1 with reservoir 5, is looped downward below the source of supply to provide a length of water-column in the lift portion of $6^a$ sufficient when expanded by the compressed air to reach the required elevation and produce the desired velocity, but more especially to provide a column of water in the portion $6^b$ to balance that in the portion $6^a$ and which will serve to cause the expansion of the latter when aerated, the weight of the column in the portion $6^b$ overbalancing that to be aerated and causing the same to rise to the reservoir 5.

In order to obtain the aeration in the desired column, the compressed air is discharged therein above the point of equilibrium, as shown, and, if desired, the air-pipe may be extended to a further height within the column and discharge the compressed air at different elevations.

For the purpose of preventing the water from entering the air-pipe 4 when for any reason the system is not working, as by reason of the absence of the requisite air-compression, a suitable check-valve may be employed to close the air-pipe, and in Fig. 4 a simple form of valve is shown, in which a disk 7 closes the pipe by the weight of the water on said disk. This disk is retained and guided in its movement by the stem 7ª and opens readily to the air-pressure.

Connecting the source of supply with the air-compression chamber 3 is a conduit 8, which carries down the waste water from the source of supply and is utilized, as stated, to conduct continuously to said chamber a supply of compressed air. The air is taken in at the opening 9, formed in said conduit at or near the point of greatest vacuum, and becoming entrapped in the falling column of water is carried down, compressed by the weight of the column, and liberated within the compression-chamber to maintain the supply of compressed air therein.

In order to increase the facility with which the air is taken into the descending column of water and also to prevent the egress of the water through the opening 9, the conduit is provided with a tapering section or throat 8ª, arranged therein and extending down past the opening 9, as indicated in dotted lines, the action of which is such as to direct the water past said opening and at the same time insure a suction which will cause the requisite quantity of air to be entrapped in the descending column.

The conduit 8 extends vertically for the entire length of the descent and at its base has a horizontal continuation 8ᵇ, which connects with the compression-chamber at a point sufficiently below the normal water-level therein to keep the discharge-opening submerged, yet providing for the addition of the incoming water to the body of water within the compression-chamber at the water-level, so that the displacement of the water therein will always be from the bottom and in the order in which it enters said chamber, thus giving time for the separation of the compressed air from the water and prevent the air from being carried out of said chamber. The horizontal arrangement of the discharge-end portion of the conduit and the point at which the discharge is made are relied upon for the above-stated purposes, but mainly in connection with the further arrangement of the horizontal continuation of the conduit upon a tangent to the cylindrical walls of the compression-chamber in order that the incoming water will be directed around the walls thereof and a swirling action of the entire body of water brought about, which will insure the retention of the water and cause it to pass out of the chamber only after displacing the body of water therein and in the order in which the water has entered, this being accomplished by the current, which will cause the water to form a vortex, as shown, which also insures the retention of the incoming water nearer the surface by the centrifugal action of the current, which causes the incoming water to make a number of circuits before reaching the center of the vortex.

To further carry out the swirling action of the water within the chamber, said chamber may be formed closed at its bottom and provided with a discharge-pipe 10, leaving the same on a tangent, as shown in dotted lines in Fig. 5, in which a more nearly vertical arrangement of the parts of the apparatus is also shown.

It will be observed that as the water rises in the compression-chamber the air-pressure becomes less and the flow into the reservoir 5 is in consequence slower, and as the air accumulates, forcing the water down to a lower level in the compression-chamber, the compression increases and the air escapes with more rapidity and increases the volume of the flow, thus making the regulation entirely automatic.

The apparatus is also self-governing with respect to the cutting off of the flow when the reservoir 5 becomes filled, as the water in the tank when a certain level is reached will add its weight to the lifting-column, so that the compressed air will have no power to make a further lift of the water owing to the limit of possible lift being reached. Ordinarily, however, the water will be conducted from the point of desired lift in a continuous flow and utilized for irrigation and other purposes, and then the provision for automatically stopping the pumping operation will not be used.

Having thus fully described my invention, what I claim, and desire to secure by Letters Patent, is—

1. In combination, a source of water-supply having an effective head, a basin below the source of supply, an air-compression chamber in open relation with the water in said basin, a conduit connecting the source of supply with the compression-chamber and having opening or openings for the admission of air, a conduit connected to the said source of supply, looped down below the same and extending to the point of required lift above said supply, and a conduit connecting the lift portion of said looped conduit with said air-compression chamber, substantially as and for the purpose set forth.

2. In combination, a source of water-supply having an effective head, a basin below the source of supply, an air-compression chamber in open relation with the water in said basin, a conduit connecting the source of supply with the compression-chamber and having opening or openings for the admission of air, a conduit connected to said source of supply, looped below the same and extending to the point of required lift above said supply, and a reservoir connecting with the discharge end of said conduit and having its water-level above said discharge end of the conduit, and means for introducing into the lifting portion of said conduit compressed air from said compression-chamber, substantially as and for the purpose set forth.

In testimony whereof I have signed my name to this specification in the presence of two subscribing witnesses.

WALTER R. BURKHARD.

Witnesses:
B. G. MULLINS,
ORA L. MULLINS.